United States Patent [19]

Rüb et al.

[11] Patent Number: 4,562,395
[45] Date of Patent: Dec. 31, 1985

[54] DAMPED STEPPING MOTOR FOR THE DRIVING OF A MEASURING MECHANISM, PARTICULARLY A ROLLER COUNTING MECHANISM HAVING A CONTROL CIRCUIT ARRANGEMENT

[75] Inventors: Walter Rüb, Sulzbach; Ulrich Brüggemann, Oberursel, both of Fed. Rep. of Germany

[73] Assignee: VDO Adolf Schindling AG, Frankfurt am Main, Fed. Rep. of Germany

[21] Appl. No.: 628,531

[22] Filed: Jul. 6, 1984

[30] Foreign Application Priority Data

Jul. 6, 1983 [DE] Fed. Rep. of Germany ....... 3324257

[51] Int. Cl.⁴ .............................................. H02P 8/00
[52] U.S. Cl. ..................................... 318/696; 318/685
[58] Field of Search ................ 318/696, 685, 138, 254

[56] References Cited

U.S. PATENT DOCUMENTS 4,385,265 5/1983 Uzuka .................................. 318/138
4,412,166 10/1983 Crider et al. ........................ 318/696

Primary Examiner—William M. Shoop, Jr.
Assistant Examiner—Saul M. Bergmann
Attorney, Agent, or Firm—Martin A. Farber

[57] ABSTRACT

A damped stepping motor (1) for the driving of a measuring mechanism is acted on with approximately rectangular pulses by a control circuit arrangement having at least one amplifier (amplifier-transistor 5) as controlled switch. These pulses are obtained from measurement pulses. For the damping of the noise of the stepping motor and the measuring mechanism connected with it via a transmission, the amplifier forming the controlled switch is connected by a delay of the first order (capacitor 9, series resistor 10), so that the edges of the pulses fed into one coil are rounded.

8 Claims, 4 Drawing Figures

DAMPED STEPPING MOTOR FOR THE DRIVING OF A MEASURING MECHANISM, PARTICULARLY A ROLLER COUNTING MECHANISM HAVING A CONTROL CIRCUIT ARRANGEMENT

BACKGROUND OF THE INVENTION

The invention relates to a damped stepping motor for the driving of a measuring mechanism, particularly a roller counting mechanism having a control circuit arrangement which has at least one amplifier as controlled switch.

The invention relates to the above and wherein coils of the stepping motor are fed with approximately square pulses in accordance with measurement pulses supplied by a measurement transmitter.

The prior art includes a mechanical odometer having an electric motor which drives digit wheels by means of a worm/sprocket-wheel transmission. The electric motor may be of the stepping or DC type. The motor is fed with an exciter signal, for instance a series of bipolar pulses indicating the speed of the vehicle. In order to prevent an undesired reversal of the odometer which is connected with the motor as well as a vibrating of the transmission wheels transmitting the rotary energy from the motor to the digit wheels, use is made of a support of the type of a one-way clutch for the mounting of the drive shaft of the electric motor (Federal Republic of Germany OS No. 31 27 141). This one-way clutch, however, results in a substantial increase in the structural expense and is furthermore subject to wear.

Attempts have already been made to damp the noise developed by measuring mechanisms connected to stepping motors, particularly counting mechanisms. The development of noise is particularly disturbing when such measuring mechanisms or counting instruments are used in combination with other, but electronically operating, indicating devices which naturally produce practically no noise. The reason for the development of noise on the part of the measuring mechanisms of counting mechanisms is the intermittent stepping movement of the stepping motor. Its rotor swings beyond the desired position to be reached in each case as a result of its moment of inertia and then back again. As a result, noise is caused by the tooth backlash present between the gear elements—worm and worm wheel. The oscillating movements produced by the stepping motor are transmitted up to the number rollers and counter pinions.

In a series counter forming part of the prior art it has been attempted to reduce the influence of motor oscillations in step-down gearings by a high transmission ratio so that the number rollers and pinions insofar as possible no longer oscillate. This high transmission, however, results in greater expense than a smaller transmission ratio.

One could consider reducing the noise by the use of relative soft materials for the transmission elements such as worm and worm wheel as well as drive sprockets. The manufacture of these parts from soft materials which are to be connected to other materials at particular places is, however, expensive. Furthermore, such measures are frequently still not sufficient in order to obtain the desired quiet operation.

Furthermore, mechanical damping devices can be provided, particularly ones operating on the frictional-force principle, but the usable motor torque is weakened by this damping measure and the operating limits of the motor are reduced. For at least partial compensation the starting voltage or the amplitude of the pulses feeding the motor must be increased. The possibility of using friction-dampening means is thereby limited.

Other mechanical damping-devices can also be used only to a limited extent and with difficulty since, as a rule, they require additional space and/or increase the expense of construction or operation for the combination of the stepping motor with the measuring mechanism.

Oil-damping-systems, possibly in combination with epilamization, have the disadvantage that the degree of damping depends essentially on the amount of oil and its viscosity. In case of escaping oil, reductions in damping or possibly disturbances in operation are to be feared.

In accordance with another principle, the rotor of the stepping motor can be connected via a spring storage device to the transmission elements—worm or worm wheel. Such a spring storage device can, however, be designed only optimally for one frequency while for the drive of measuring mechanisms the stepping motor is customarily acted on by a large difference in frequencies, for instance from 0 to 4 Hertz.

It is thus an object of the present invention to develop a damped stepping motor having a control circuit arrangement in such a manner that an effective damping of noise is obtained with the same amplitude of exciter pulse and stepping frequency without reducing the reliability of operation.

In this connection the fundamental disadvantages of mechanical damping devices such as large stepping-up of the transmission coupling the stepping motor with the measuring mechanism, use of relatively soft materials for gear elements, friction damping, oil dampers or spring storages are to be avoided. It is important that, even when employing the dampening in accordance with the invention, a large frequency range of the measurement pulses be conducted without error to the measuring mechanism.

SUMMARY OF THE INVENTION

According to the invention, the amplifier (amplifier transistor 5) incorporates a delay circuit of first order so that the edges of the pulses fed into at least one coil (Fig. 4) are rounded.

In accordance with the invention a particularly suitable electric measure is taken in order to avoid oscillations of the rotor of the stepping motor and thus noise, in particular, in a transmission which transmits the rotor movement to a measuring mechanism. For example, with the same mechanical construction of the stepping motor and of the roller counting mechanism as well as of the transmission gearing, reductions in noise of about 8 db were measured.

The additional expense for this electric damping is particularly small since it is provided in the amplifier circuit. The damping is large enough so that the edges of the normally approximately square pulses which feed the stepping motor are rounded in accordance with an equalization function. As can be noted from the drawing, in $U_{M1}$ as explained further below with reference to $U_{M2}$, the pulses commence practically without delay and pass with decreasing slope toward the horizontal. With reversed course of time the pulses again flatten out, a lengthening of the pulse taking place in the region of smaller energy. The fundamental phase relationship between two trains of pulses with which, for instance, two coils of the stepping motor are fed 180 electrical degrees apart, is, however, retained.

In one typical and particularly advantageous circuit arrangement, a capacitor having a capacitance of about 4 to 5 μF is sufficient as negative feedback capacitor. Here the amplifier (amplifier-transistor 5) receives negative feed back to form the delayed time behavior with a capacitor (9).

This capacitor is inexpensive and compact, for instance in contradistinction to a flattening of the pulse trains feeding the coils by using two capacitors connected in parallel directly to the coils. In experiments capacitors of the order of magnitude of 200 to more than 450 μF were found necessary in the last mentioned case.

It is particularly noteworthy that due to this electrical damping the starting voltage (pulse amplitude) had to be increased only slightly while the greatest permissible stepping frequency practically doubled.

It is furthermore noteworthy that when using a low-frequency single-phase stepping motor with a two-coil system only the amplifier feeding one coil has to incorporate a delay of the first order while the second amplifier can be retained in conventional form. In this way there is obtained a further reduction of the expense for the damping of the noise. This advantageous effect can be explained by the overlapping of the coil excitation obtained due to the delayed fading away of the pulses which are fed into the one coil.

That is, according to the invention, with a damped low-frequency single-phase stepping motor having a two-coil system, only one (2) of the two coils (2, 3) is fed by the amplifier (amplifier-transistor 5) developed as delay member, while the second (3) of the two coils is acted on via an undelayed amplifier (amplifier-transistor 4).

With the above and other objects and advantages in view, the present invention will become more clearly understood in connection with the detailed description of a preferred embodiment, when considered with the accompanying drawing, of which:

DETAILED DESCRIPTION OF THE PREFERRED EMBODIMENT

Figure 1:
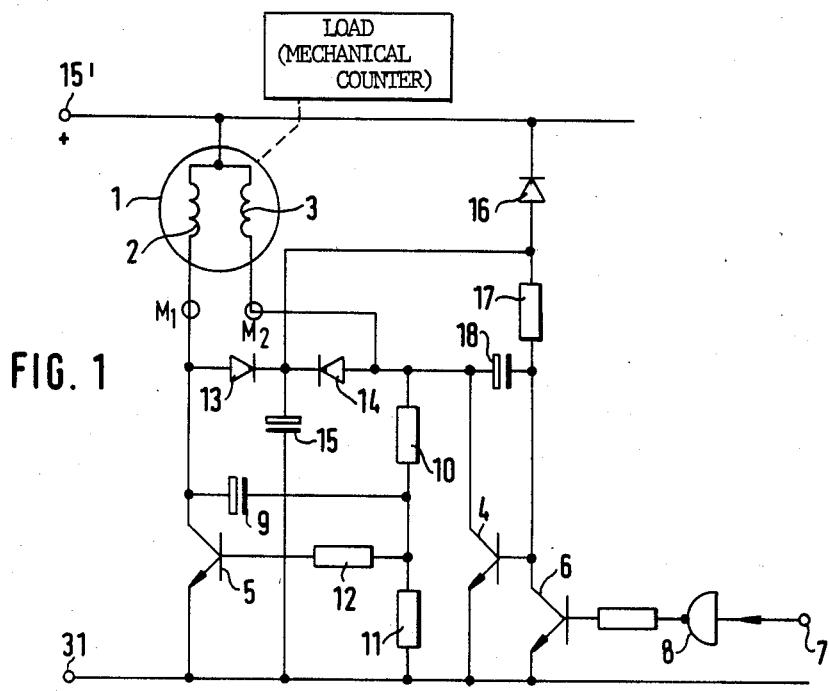
FIG. 1 is a circuit diagram of the control circuit arrangemen to the stepping motor.

In FIG. 1, 1 is a low-frequency single-phase stepping motor having a two-coil system the two coils of which are designated 2 and 3. The stepping motor is provided in order to drive a roller counting mechanism or a series counter via a transmission which is represented by a dashed line connecting the motor and the counter.

Figure 3:
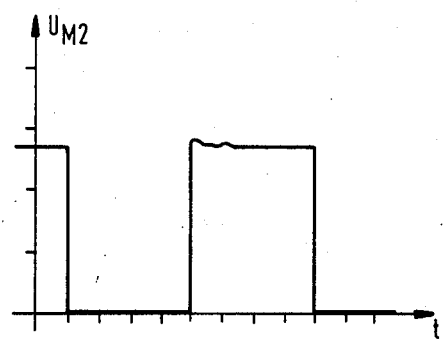
FIG. 3 is a pulse diagram of the voltage $U_{M2}$ with which one of the two coils of the stepping motor is excited.
Figure 4:
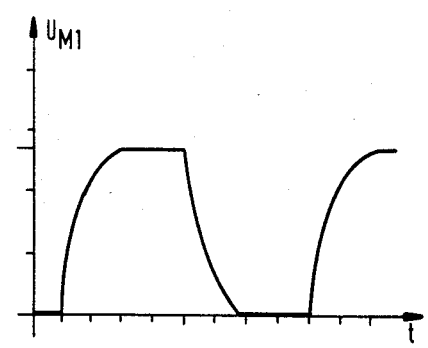
FIG. 4 is a corresponding pulse diagram for the train of the delayed pulses $U_{M1}$ with which the other coil is fed.

The electric control circuit arrangement for producing the pulses in accordance with FIGS. 3 and 4, which are also designated as feed pulses for the stepping motor, comprises essentially two amplifier-transistors 4 and 5 operating as controlled switches as well as a driver-transistor 6 controlling the amplifier-transistor 4.

Figure 2:
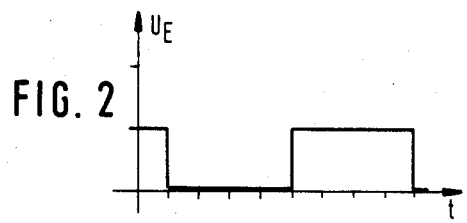
FIG. 2 is a pulse diagram of the measuring pulses.

The drive-transistor 6 is fed by a measurement value transmitter (not shown) at the terminal 7 via an inverter 8 with measurement pulses in accordance with FIG. 2. The driver-transistor, on its part, controls the amplifier-transistor 4 which thus produces control pulses for the coil 3 which are substantially square, as shown by the voltage $U_{M2}$ in FIG. 3.

Shifted in phase 180 electric degrees from the feed pulses in FIG. 3, control pulses for the coil 2 are produced by the amplifier-transistor 5. For this the amplifier-transistor 5 is activated by amplifier-transistor 4 when the latter is blocked and conversely, the amplifier-transistor 5 is blocked when the amplifier-transistor 4 conducts. The course of the pulses $U_{M1}$ is not, however, precisely analogous to the course of the pulses $U_{M2}$:

Rather, the edges of the pulses $U_{M1}$ in accordance with FIG. 4 are rounded. For this, feedback from the collector of the amplifier-transistor 5 via the capacitor 9 to the base of this amplifier-transistor is provided. The capacitor 9 is connected for this purpose between the collector connection and a voltage divider 10, 11 while the voltage divider is coupled via a series resistance 12 to the base of the amplifier-transistor 5. The diodes 13 and 14 also shown in FIG. 1 serve to break down the switch voltage peaks. A capacitor 15 is connected between the common connection of the diodes 13, 14 and ground in order to suppress noise voltage so as not to interfere with radio reception. Finally, a diode 16 serves for voltage stabilization of a battery voltage at the terminals 31 and 15' and a resistor-capacitor combination 17, 18 serves for the smoothing of the voltage or suppression of noise pulses.

The stepping motor advances two steps per cycle of the measurement pulse train and, due to the damping of the feed pulses by only one of the coils (coil 2), does so with minimum development of noise.

The circuit arrangement shown in FIG. 1 serves therefore for influencing unipolar feed pulses which are fed into one coil of a stepping motor. The circuit arrangement operates with ordinary measurement pulses.

One particularly suitable dimensioning of the means for obtaining a delayed time behavior of an amplifier-transistor includes a 4.7 μF capacitor which negatively feeds back the amplifier-transistor and a base series resistance of 560 ohms.

The following component values are used. Resistor 12 is 560 ohms, resistors 10 and 11 are, respectively 2.7 and 1.2 kilohms, and resistor 17 is 2.7 kilohms. The capacitors 9 and 15 are respectively 4.7 and 47 μF, and the capacitor 18 is 68 μF. A resistance of 6.2 kilohms is used between the invertor 8 and the transistor 16.

We claim:

1. In a stepping motor circuit for the driving of a measuring mechanism, particularly a roller counting mechanism having a control circuit arrangement which has at least one amplifier as a controlled switch, and wherein coils of the stepping motor are fed with approximately square pulses in accordance with measurement pulses supplied by a measurement transmitter, the improvement wherein said circuit comprises a first amplifier coupled to a first coil of said stepping motor and a second amplifier coupled to a second coil of said stepping motor; said second amplifier includes a delay circuit to induce a rounding of the edges of the pulses fed ito said second coil, and the motor is a damped low-frequency single-phase stepping motor having a two-coil system; and wherein only said second amplifier has the delay circuit, and said first coil is acted on by said first amplifier directly without the use of a delay circuit, thereby to inhibit mechanical vibrations and noise associated therewith.

2. The stepping motor circuit according to claim 1, wherein
said delay circuit of said second amplifier comprises negative feedback circuitry including a capacitor to form a delayed time behavior.

3. The stepping motor circuit according to claim 1, wherein
said delay circuit is of first order.

4. The stepping motor circuit according to claim 3, wherein
said second amplifier is driven by said first amplifier, said first amplifier being responsive of a signal at an input terminal thereof.

5. The stepping motor circuit according to claim 4, further comprising
means for suppressing electrical noise, said suppressing means being coupled to the junction of said first amplifier with said first coil, and to the junction of said second amplifier with said second coil.

6. The stepping motor circuit according to claim 5, wherein
said suppressing means comprises a capacitor and a pair of diodes coupling the capacitor to the junction of said first amplifier with said first coil and to the junction of said second amplifier with said second coil, said diodes connecting with one terminal of said capacitor of said suppressing means, a second terminal of said capacitor of said suppressing means connecting with a current-return terminal of said first amplifier and of said second amplifier.

7. The stepping motor circuit according to claim 6, wherein
said second amplifier comprises a transistor having a collector terminal connecting with said second coil, there being a resistive voltage divider circuit connected between a base terminal and an emitter terminal of said transistor, and wherein the capacitor of said delay circuit is coupled between said collector terminal of said second amplifier and a junction of resistors of said voltage divider circuit.

8. The stepping motor circuit according to claim 7, wherein
said first amplifier comprises a transistor having an emitter terminal coupled to one branch of said voltage divider circuit, and wherein a second branch of said voltage divider circuit is coupled to a collector terminal of said transistor of said first amplifier, output current of said collector terminal of said transistor of said first amplifier being applied to said first coil.

* * * * *